Patented May 1, 1923.

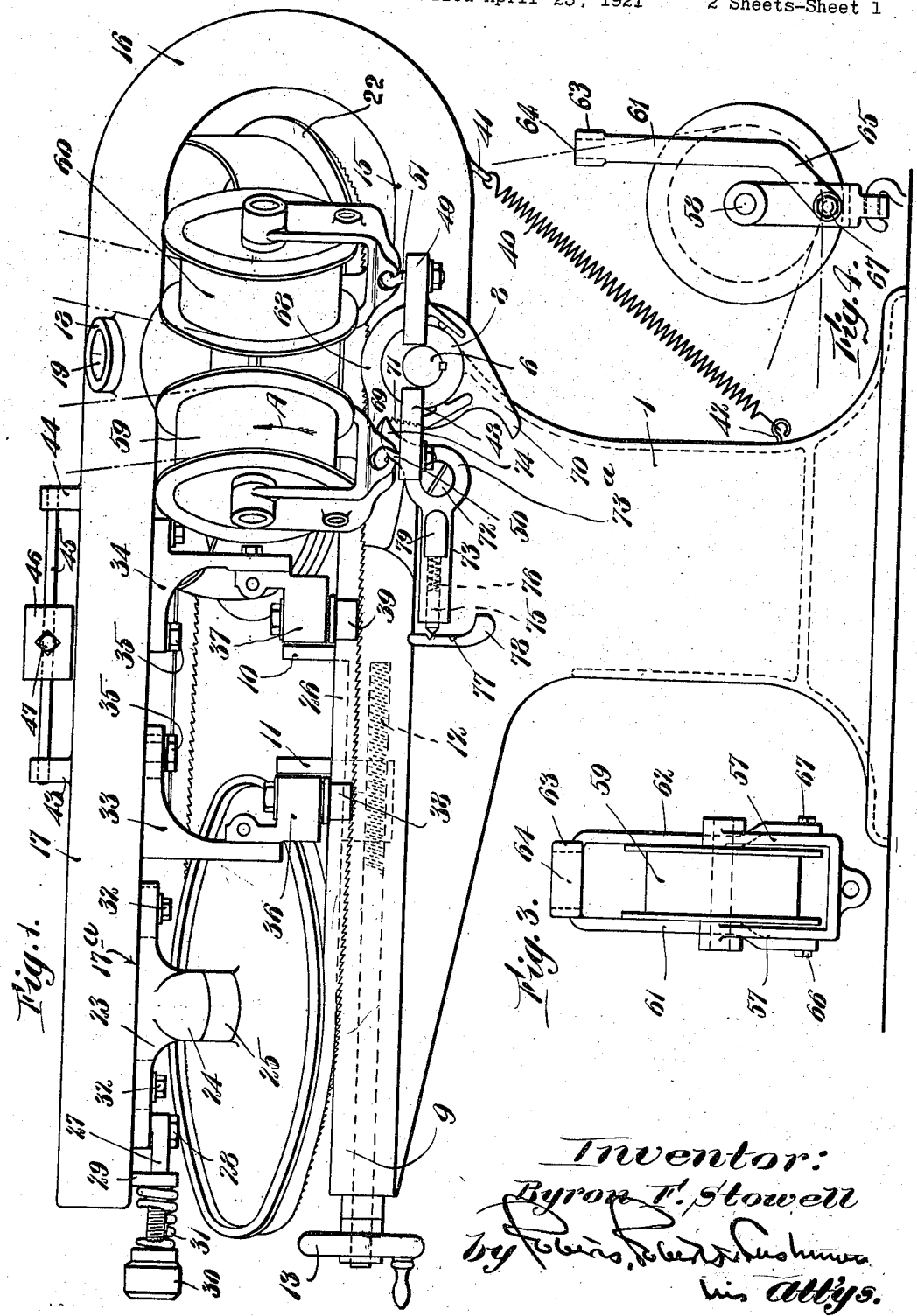

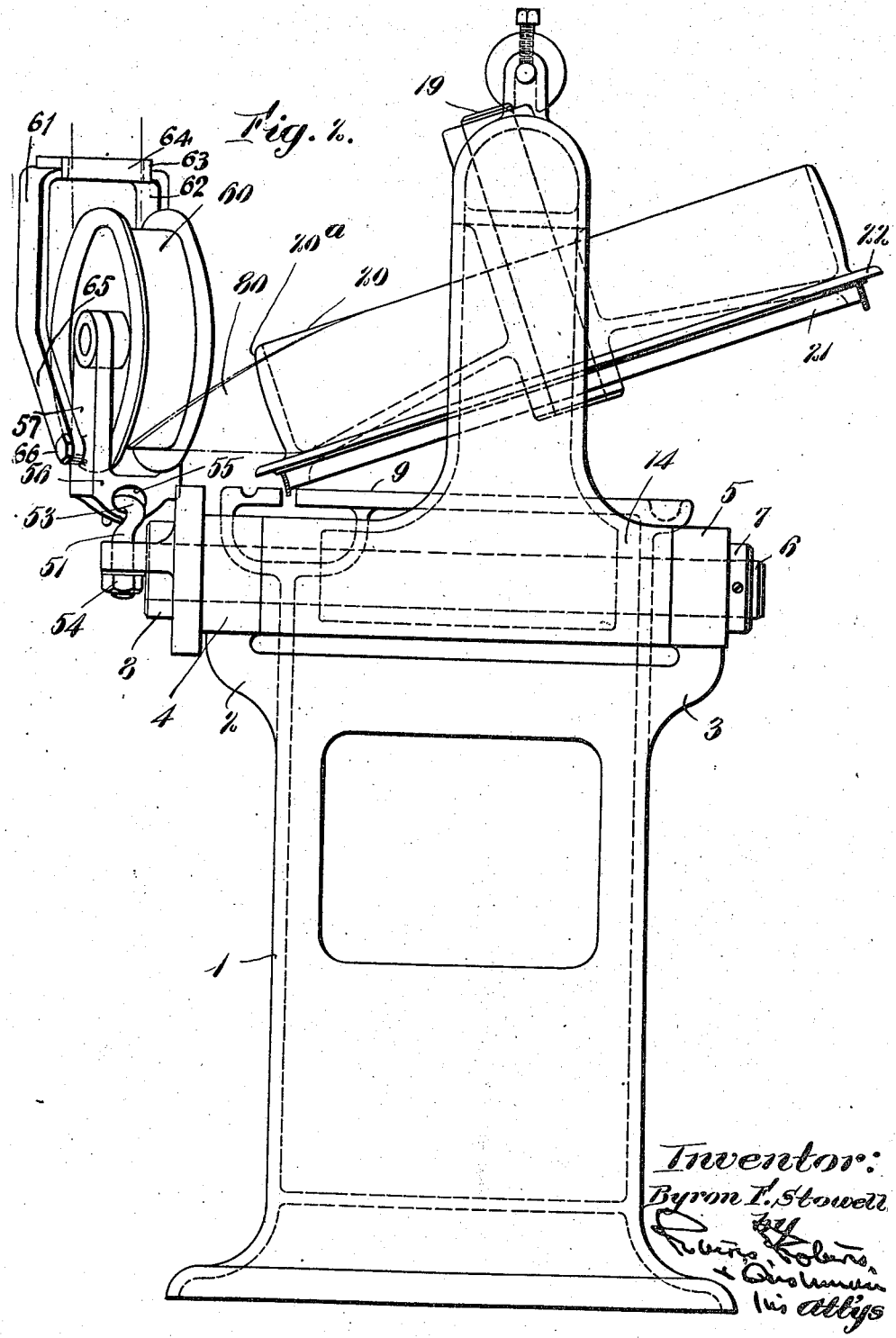

1,453,609

UNITED STATES PATENT OFFICE.

BYRON F. STOWELL, OF SPRINGFIELD, MASSACHUSETTS, ASSIGNOR TO METAL SAW AND MACHINE CO. INC., OF SPRINGFIELD, MASSACHUSETTS, A CORPORATION OF MASSACHUSETTS.

BAND-CUTTER CUTTING MACHINE.

Application filed April 23, 1921. Serial No. 463,980.

*To all whom it may concern:*

Be it known that I, BYRON F. STOWELL, a citizen of the United States of America, and resident of Springfield, in the county of Hampden and State of Massachusetts, have invented new and useful Improvements in Band-Cutter Cutting Machines, of which the following is a specification.

This invention concerns machinery for working metal, wood or other material and especially relates to means for effecting the engagement and separation of or relative motions between the material to be worked and an instrumentality for operating upon the material, as well as to simple and improved means for actuating the operative instrumentality employed.

While the invention is useful in connection with and may be embodied in any machinery in which there is relative motion of approach or motion during contact between the material worked upon and the operative instrumentality of whatever kind the latter may be, it has herein been illustrated by way of example, as embodied in a machine of that type wherein a band-saw is utilized for the cutting of metal. Such machines, as commonly constructed, comprise an endless saw blade, together with means for supporting and for imparting operative movement thereto, a work-vise or holder, and means permitting relative movement of the saw and work holder, and for permitting a regulated feed of the saw into the work.

In any machine in which a material working instrumentality is brought into contact with material for operating upon the latter, the proper pressure between the work and such instrumentality depends upon many factors, of which the hardness or toughness of the material and the speed of movement of the operative instrumentality may be cited as examples. Unless adequate provision be made for properly regulating such working pressure, damaged work or broken tools are almost certain to result, and although various attempts have been made to provide for such regulation, as by the employment of mechanically acting feeds employing screws or gearing, the inherent characteristics of such devices necessarily inhibit a delicate regulation of the feed, such as will care for unexpected variations in any of the factors which determine the desired pressure.

When the operative instrumentality is a band-saw, certain difficulties which are met with to some extent in all material-working machines are greatly accentuated. In the more practical forms of such machines, wherein the work is held stationary while the saw blade is approached thereto, it is necessary to mount the saw and its guide and drive means, together with auxiliary parts, upon a movable frame or support, which, with the parts carried thereby, is necessarily of considerable weight, and the problem of properly feeding the saw toward the work whereby to secure the desired operative pressure at all times is one of great difficulty. For example when in the employment of such a saw, an extremely hard material is encountered, a feed mechanism of usual form and adjusted for a given pressure may hold the saw so firmly to the work as to ruin the cutting edges of the teeth, while on the other hand, if very soft or tenacious metal be encountered, the saw may be urged by the usual types of feed to take so deep a cut as to strip its teeth. Thus, in either case, the saw blades may be injured or broken, necessitating an expensive replacement and the loss of valuable time.

Principal objects of the present invention are in general to overcome by simple, cheap and strong devices the difficulties commonly experienced in connection with the maintenance of the proper working pressure between a material-working tool and the material operated upon, and in particular to improve, strengthen and simplify the construction and operation of a band-sawing machine. To this end, the machine may comprise a swinging saw frame having saw driving and guiding pulleys thereon, and for imparting movement to such drive pulley, a belt receiving its motion from an overhead shaft or other source of power may be arranged to act directly upon an element of said pulley or on a part moving therewith. For securing the desired automatic regulation of the working pressure of the saw, such drive belt may be so arranged as that a component of the driving tension thereon shall tend to swing the saw frame, together with the saw blade, away from the work. Increased resistance at the cutting edge of the saw, such as may be occasioned by the occurrence of extremely hard and resistant material, or by the biting of the saw too deeply into a relatively soft material, demands the application of greater driving force, and thus the component of force tending to lift the saw from the work will be increased and the pressure automatically relieved in substantially direct proportion to the resistance encountered.

A further object is to provide simple and improved means whereby the operative instrumentality, as for example a band saw, may be actuated in an efficient and reliable manner by means of a direct belt drive regardless of the position of adjustment of the saw-supporting frame.

As one, and a preferred, embodiment of means for attaining the desired results, that illustrated in the accompanying drawings may be employed, in which:—

Fig. 1 is a side elevation of the machine illustrating the saw as in operative position, certain parts being removed for clearness of illustration;

Fig. 2 is an end elevation to somewhat larger scale of the mechanism shown in Fig. 1;

Fig. 3 is a detached end elevation illustrating details of a belt guiding pulley together with a pulley directing device associated therewith; and Fig. 4 is a side elevation of the structure shown in Fig. 3.

The base of the machine is indicated at 1, such base being in the form of a casting if desired, or constructed in any other suitable manner. At one end of the base, and at the upper portion thereof, are provided a pair of upstanding brackets 2, 3, respectively, such brackets providing the bearings 4, 5. Rotatably supported within the bearings 4, 5, is a shaft 6 which extends transversely across the upper portion of the base. The shaft 6 projects somewhat beyond these bearings and at one end is provided with a collar 7 fixed thereto in any suitable manner as for example by means of a set screw. The opposite end of the shaft 6 projects beyond the bearing 4 and has keyed thereto a collar 8.

Upon the upper surface of the base 1 is provided a work supporting table 9 one end of which is defined by a fixed clamping jaw 10. A cooperating and movable jaw 11 is arranged to slide longitudinally of the work table toward and from the jaw 10 and for actuating the movable jaw 11 a screw threaded shaft 12 is provided. This shaft has threaded engagement with an opening in an element of the jaw 11 and may be rotated by means of a hand wheel 13 or in any other desired manner.

Surrounding the shaft 6 and between the bearings 4, 5 is a sleeve member 14, such sleeve member having rigidly connected thereto or integral therewith an outstanding arm 15. The arm 15 is continued upwardly in a curve 16 and is then carried in a longitudinal direction over the work support 9 of the machine, thus providing the elongated arm or frame member 17.

The frame member 17 is provided with a boss at 18 having an opening for the reception of a stub shaft 19, such shaft being securely fixed within the opening in any desired manner. The boss 18 is so arranged that the axis of the shaft 19 lies in a predetermined relation to a radial plane of shaft 6, and inclined to work shaft 6, for instance so that the axis of the shaft 19 will intersect the axis of shaft 6 at an angle of about 70°. Upon the lower portion of the shaft 19 is arranged to turn freely a combined driving and guiding wheel and pulley 20 for the saw, such pulley comprising the belt engaging element 20$^a$ and the saw engaging element 21, which elements may be separated by a radial flange 22.

Near its free extremity the frame member 17 is provided with a suitable machined face 17$^a$ for the reception of a bracket 23, such bracket being provided with a stub shaft 24 arranged substantially parallel to the axis of shaft 19, and upon which is mounted a saw guiding wheel 25. At 26 is shown a band saw blade of usual construction which passes around the wheel 25 and the element 21 of the pulley 20, whereby the saw blade is properly guided and driven. For tensioning the saw blade, the bracket 23 may be arranged for sliding adjustment longitudinally as permitted by hold-down guide screws 32 passing through longitudinal slots in bracket 23. For adjustably positioning the bracket it may be provided with a rod 27 suitably connected thereto as by means of a bolt 28, such rod passing through a guide bracket 29 carried by the frame member 17 and being screw-threaded at its outer extremity for engagement by an adjusting nut 30. Between the adjusting nut 30 and the bracket 29 is interposed a coil spring 31 which surrounds the rod 27, the tension of which may be varied by means of adjusting nut 30. By this arrangement the tension on the bracket 23 and the saw may be adjusted without strain upon the screws 32, the stress being taken by the fixed member 29.

For guiding the operative run of the saw adjacent the cutting point a pair of brackets 33, 34, are provided, such brackets being adjustably secured to the frame member 17 as by means of bolts 35. The brackets 33 and 34 serve to support adjustable members 36, 37 respectively upon which are carried pairs of guide rolls, as 38, 39, such rolls serving to guide the saw adjacent the cutting point and also to maintain the operative run of the saw in the desired plane of movement.

For counterbalancing the frame comprising the members 15, 16, 17, a spring 40 is provided, such spring being secured as at 41 to the member 15 and at 42 to the base of the machine, this spring being of just sufficient strength to maintain the saw frame in its upper and inoperative position when swung away from the work table by the operator. Projecting from the upper portion of the frame member 17 are a pair of brackets 43, 44, such brackets serving to support a longitudinally extending rod 45. 46 is a weight slidable upon the rod 45 and provided with a set screw 47 whereby it may be fixed in adjusted position. To the collar 8 are secured a pair of oppositely extending bracket arms 48, 49 respectively, such bracket arms being provided with openings therein in which are arranged freely turnable pivot pins 50, 51 respectively. These pivot pins as clearly indicated in Fig. 2 for example, are provided with open loops or hooks, such as 53 at their upper ends, and are screw threaded at their lower ends for engagement by nuts, as 54, whereby they are secured against removal from the openings in their respective brackets. Engaging the hook members of each of the pins 50, 51, respectively, is an opening 55 formed in a yoke frame 56, each such frame providing a pair of upstanding and substantially parallel arms such as 57. These arms, near their upper ends, are provided with openings for the reception of shafts such as 58, each shaft serving to support a freely turnable guide pulley such as 59, 60 respectively. These pulleys are preferably provided with radial flanges at their edges although this is not essential. As thus arranged and by reason of the fact that the openings 55 loosely engage the looped portions 53 of the pins 50, 51 and as the latter turn freely in the openings in brackets 48, 49, respectively, it is clear that the pulleys 59, 60 are mounted for universal movement. Associated with one or both of the pulleys 59, 60, and herein illustrated as applied to the pulley 59 (see Figs. 3 and 4) is a pulley directing device comprising a frame of substantially inverted U-shape. This frame consists of the spaced side arms 61, 62 and the transverse member 63, the latter being provided with a slot or opening 64 therethrough. The arms 61, 62 are preferably provided with angularly disposed extremities as indicated at 65. Fig. 4, such extremities being provided with openings through which extend bolts such as 66, 67 for securing them to the side members of the pulley supporting yokes.

To the collars 8 is also secured the flange member 68, such member being provided with an outstanding lug 69 and with an ear 70 spaced therefrom. Intermediate such lug and ear the edge of the flange is provided with a series of ratchet teeth 71. Pivoted upon a suitable bolt or pin 72, secured to the base member of the machine is a lever device 73, such lever device being provided at one extremity with a pawl or dog 74 which lies between the ears 69, 70 and is engageable under certain circumstances with the ratchet teeth 71. The lever 73 is also provided with a longitudinal bore in which is slidably arranged a locking bolt 75, such bolt being normally projected by means of a spring 76 seated within the bore. The locking bolt at its outer extremity may be provided with a suitably shaped end adapted to engage with either of a pair of slots or notches 77 formed in a fixed bracket 78 projecting from the machine base. A handle 79 may also be secured to the lever 73.

At 80 there is indicated in broken lines a driving belt, such belt engaging the guide pulleys 59, 60 and the belt engaging element 20ᵃ of the saw driving pulley 20. This driving belt may be trained over a drive pulley upon an overhead shaft or over any suitable guide pulleys not shown and interposed between the guide pulleys 59, 60 and such power actuated pulley. As indicated in Fig. 1, the tension run of the driving belt passes over the pulley 59 in the direction of the arrow A. With this arrangement it is evident that a certain component of the driving tension upon the belt 80 will tend to swing the frame comprising the members 15, 16, 17 in a clockwise direction about the axis of the shaft 6 and it is manifest that such movement of the frame tends to remove the saw from engagement with the work held between the clamping jaws 10, 11.

In the normal operation of the machine, the weight 46 will be so adjusted upon the rod 45 as to produce sufficient overbalancing of the saw supporting frame and its associated parts to produce the desired working pressure between the edge of the saw blade and the material. As the guide pulleys 59, 60 are arranged at substantially equal distances upon opposite sides of the vertical plane of the axis of shaft 6, it is evident that the tension of the driving belt and its operative relationship to the pulley element 20 will be substantially unchanged in all positions of the saw frame.

With the parts in the position indicated in Fig. 1, it is assumed that the saw has just completed its cut through the material and it will be noticed that the ear 69 of the flange 68 has engaged the dog 74 and has swung the lever 73 about its pivot so as to disengage the locking bolt 76 from the lower slot 77, such bolt being about to enter the upper slot 77. In this position of the parts the further downward movement of the saw is positively prevented. Preparatory to another operation, the operator may freely swing the entire saw frame upwardly about the axis of shaft 6, carrying the saw blade away from the work table and permitting the removal from and reinsertion of work between the clamping jaws. As the frame is swung upwardly, the ratchet teeth 71 successively engage the end of the dog 74 and thus serve to maintain the frame in its inoperative position until released by the operator. The ear 70 of the member 68 serves as a limiting stop by engaging the hub portion 73ª of the lever 73 whereby to limit upward throw of the saw carrying frame.

When the operator desires to bring the saw into contact with the work he grasps the handle 79 and swings the lever 73 downwardly, thus removing the dog 74 from the teeth 71. The frame now swings downwardly under the action of its own weight and that of the counterpoise 46, until the saw is brought into contact with the work. If during the operation of the saw blade material of undue hardness is encountered such that the saw teeth find difficulty in cutting the same, it is evident that the drag upon the saw blade will be increased with increased consumption of power. Such increase in power consumption manifests itself in increased tension upon the belt 80, and consequently the upward component of the belt tension is correspondingly increased. Such increased component tends to resist further downward movement of the saw frame under the action of gravity and thus automatically decreases the working pressure between the saw teeth and the material. The same effect is noted if material of very soft or tenacious quality is encountered or if the saw loses its set and thus under any such unusual conditions of operation the saw pressure is automatically relieved whereby breakage or serious injury to the saw is in large measure avoided.

By the employment of the universally mounted guide pulleys 59, 60 it is possible to maintain the driving belt in proper operative relation thereto, regardless of the position of the saw supporting frame, but for positively maintaining the faces of such pulleys in the planes of the runs of the belt leading to and from the same, the pulley directing devices hereinbefore described are employed. As the runs of belt pass through the slots 64 in such directing devices and as such slots lie at a substantial distance away from the pivotal mountings of the pulleys, it is evident that the runs of belt act with a considerable leverage upon such pulleys whereby positively to turn such pulleys in accordance with variations in the plane which the belts may assume during the swinging of the saw carrying frame. By the employment of the belt guiding means hereinabove described, it is possible to secure proper driving of the saw under all conditions of use and in a very simple and effective manner without the necessity for employing intermediate gearing or other mechanism. By the employment of the devices hereinbefore described, wherein the saw pressure is automatically regulated, it is possible to do away with mechanism such as previously have been proposed for controlling the feed motion of the saw and to secure in a simple and effective manner the desired and proper operative relationship of the work and the operative instrumentality such as to regulate the working pressure. While a preferred form of mechanism for carrying out the objects of the invention has hereinbefore been described in a specific manner, it is clear that various changes in details of construction as well as rearrangements and variations in proportion of parts might well be made without departing from the spirit of the present invention.

Having thus described the invention in a preferred embodiment of the same, what I claim is:

1. A material working machine having thereon means to support the material, a pivotally supported frame, a material working instrumentality carried by said frame and movable in a plane inclined to that of the frame, said instrumentality being movable toward and from the material, and an endless flexible band constructed and arranged to actuate said instrumentality directly in all operative positions thereof.

2. A material working machine having an elongated frame pivoted to swing about a substantially horizontal axis, a power driven endless, flexible blade mounted upon said frame, and an endless belt for directly applying the driving power to said blade, said belt being guided by devices constructed and arranged to permit the belt to be operative for driving the blade in all positions of the frame.

3. A material working machine comprising an elongated frame pivotally supported to swing about a predetermined axis, a bandsaw carried by said frame, and a power driven belt and guiding means therefor for directly actuating the saw, said guiding means being constructed and arranged to permit the belt to actuate the saw in all positions of the frame.

4. A material working machine comprising a pivotally supported frame, a pulley carried by said frame adjacent to the pivotal axis thereof and rotatable about an axis intersecting that of the frame, a movable tool mounted upon the frame and receiving its movement from said pulley, and a drive belt having operative engagement with said pulley in all positions of the frame.

5. A machine of the class described comprising a pivotally supported saw-carrying frame, a saw actuating pulley mounted upon said frame, a pair of guide pulleys supported by said frame, and a drive belt engaging said saw actuating pulley and said guide pulleys and operative to turn said actuating pulley in any position of the frame.

6. A material working machine comprising a tool, a swinging frame for supporting the same, means carried by the frame for imparting movement to the tool, a guide pulley supported by said frame at either side of the pivotal axis thereof, and a drive belt engaging the respective guide pulleys and operative for driving said tool actuating means.

7. In a machine of the class described a tool supporting frame pivotally mounted to swing about a fixed axis, a pulley carried by said frame and turnable about an axis intersecting the axis of the frame, guide pulleys arranged upon said frame at substantially equal distances upon opposite sides of its axis, and a drive belt engaging said pulleys.

8. A material working machine comprising a tool supporting frame pivoted to turn about a fixed axis, a pulley carried by said frame and having its axis intersecting that of the frame, and a pivotally supported pulley arranged at either side of said fixed axis and constructed and arranged to guide a belt for driving said first named pulley.

9. A machine for operating upon material comprising a tool supporting frame swingable about a fixed axis, a pulley mounted upon said frame and turnable about an axis substantially intersecting the axis of the frame, and a universally movable guide pulley carried by the frame at substantially equal distances upon either side of the axis thereof and constructed and arranged to guide a belt for driving said first named pulley.

10. In a machine of the class described, a frame pivotally supported to swing about a substantially horizontal axis, a bracket laterally outstanding from said frame at a point adjacent to and to one side of its axis, said bracket having an opening therein, a pivot pin loosely engaging said opening and having a loop adjacent one of its ends, a substantially U-shaped yoke having an opening at its closed end loosely engaging said loop, and a guide pulley pivotally supported between the opposed arms of said yoke.

11. A machine of the class described comprising a work support, an elongated frame pivotally supported thereon to permit one end of the same to move toward and from the work support, a pulley mounted upon said frame to turn about an axis intersecting that of the frame, a guide pulley mounted upon said frame at either side of the axis thereof, and a belt engaging said first named pulley and said guide pulleys, said belt being so constructed and arranged that the tensioned run thereof engages that guide pulley nearest the work support.

12. A material working machine comprising a frame pivotally supported to swing about a fixed axis, a pulley mounted upon said frame and turnable about an axis intersecting the axis of the frame, said pulley having blade-engaging and belt-engaging elements, a flexible endless blade engaging the first of said elements, a drive belt engaging the second of said elements, and means for ensuring operative engagement of said belt with said belt-engaging element of the pulley in all positions of angular adjustment of the frame.

13. A band saw machine comprising a pivoted saw frame, a saw driving pulley mounted thereon and turnable about an axis intersecting that of the frame, a pair of guide pulleys carried by the frame and spaced equally from and on either side of the axis thereof, and a main driving belt engaging said guide pulleys and said saw driving pulley, respectively.

Signed by me at Springfield, Massachusetts, this 31st day of March, 1921.

BYRON F. STOWELL.